United States Patent
Shibuya et al.

(10) Patent No.: US 11,727,179 B2
(45) Date of Patent: Aug. 15, 2023

(54) TRANSMISSION PATH DESIGN ASSISTANCE SYSTEM, TRANSMISSION PATH DESIGN ASSISTANCE METHOD, AND COMPUTER READABLE MEDIUM STORING TRANSMISSION PATH DESIGN ASSISTANCE PROGRAM

(71) Applicant: MITSUBISHI ELECTRIC CORPORATION, Tokyo (JP)

(72) Inventors: Koji Shibuya, Tokyo (JP); Tetsu Owada, Tokyo (JP); Keitaro Yamagishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 147 days.

(21) Appl. No.: 17/356,896

(22) Filed: Jun. 24, 2021

(65) Prior Publication Data

US 2021/0319163 A1  Oct. 14, 2021

Related U.S. Application Data

(63) Continuation of application No. PCT/JP2019/000202, filed on Jan. 8, 2019.

(51) Int. Cl.
*G06F 30/39* (2020.01)
*G06F 111/04* (2020.01)
*H01P 3/00* (2006.01)

(52) U.S. Cl.
CPC .......... *G06F 30/39* (2020.01); *G06F 2111/04* (2020.01); *H01P 3/00* (2013.01)

(58) Field of Classification Search
USPC ....................................................... 716/110
See application file for complete search history.

(56) References Cited

U.S. PATENT DOCUMENTS 7,795,993 B2    9/2010  Tsujimura
2005/0073200 A1*  4/2005  Divan ................... H02J 3/1814
                                                    307/44

(Continued)

FOREIGN PATENT DOCUMENTS

JP    2002-335108 A    11/2002
JP    2009-54957 A    3/2009

(Continued)

OTHER PUBLICATIONS

Extended European Search Report for European Application No. 19908360.1, dated Dec. 3, 2021.

(Continued)

*Primary Examiner* — Mohammed Alam
(74) *Attorney, Agent, or Firm* — Birch, Stewart, Kolasch & Birch, LLP

(57) ABSTRACT

A transmission path design assistance system assisting in the design of a transmission path with different reflection specification values for each frequency is obtained. The transmission path design assistance system includes: an acquisition unit to acquire reflection specification values of a reflection characteristic of a transmission path to be designed and a constraint of characteristic impedance distribution of the transmission path; and a computation processing unit including: a reflection characteristic calculation unit to calculate the reflection characteristic from inputted characteristic impedance distribution; a reflection characteristic modification unit to modify, on the basis of the reflection specification values acquired by the acquisition unit, the reflection characteristic calculated by the reflection characteristic calculation unit; a characteristic impedance distribution calculation unit to calculate characteristic impedance distribution from the reflection characteristic modified by the reflection characteristic modification unit; and a characteristic impedance distribution modification unit to modify, (Continued)

on the basis of the constraint acquired by the acquisition unit, the characteristic impedance distribution calculated by the characteristic impedance distribution calculation unit and output it to the reflection characteristic calculation unit.

11 Claims, 7 Drawing Sheets

(56) References Cited

U.S. PATENT DOCUMENTS

| | | | | |
|---|---|---|---|---|
| 2007/0242615 | A1* | 10/2007 | Yamamuka | H04B 3/46 370/250 |
| 2008/0004819 | A1* | 1/2008 | Namba | G01R 27/28 702/65 |
| 2008/0316136 | A1* | 12/2008 | Otsuka | H01Q 13/06 343/807 |
| 2010/0060388 | A1* | 3/2010 | Ueda | H01P 1/203 333/236 |
| 2013/0321093 | A1* | 12/2013 | Ueda | H01P 1/32 333/17.1 |
| 2015/0312059 | A1* | 10/2015 | Kato | H04L 25/022 375/296 |
| 2016/0373160 | A1* | 12/2016 | Ueda | H04B 1/582 |
| 2020/0060026 | A1* | 2/2020 | Christo | H05K 3/0005 |
| 2021/0319163 | A1* | 10/2021 | Shibuya | G06F 30/39 |

FOREIGN PATENT DOCUMENTS

| | | |
|---|---|---|
| JP | 2015-207971 A | 11/2015 |
| JP | 6385316 B2 | 9/2018 |

OTHER PUBLICATIONS

Hashash et al., "Design of Compact Impedance Matching Components," Jordan Journal of Electrical Engineering, vol. 3, No. 3, 2017 (Accepted Sep. 21, 2017), pp. 171-180, XP055864426.

Kumar et al., "Airgap Interconnects: Modeling, Optimization, and Benchmarking for Backplane, PCB, and Interposer Applications," IEEE Transactions on Components, Packaging and Manufacturing Technology, vol. 4, No. 8, Aug. 2014, pp. 1335-1346, XP011555153.

Kunze et al., "Crosstalk Mitigation and Impedane Management Using Tabbed Lines," 2015, 5 pages total, XP0055864300.

Bandler J W et al: "A Space-Mapping Design Framework", IEEE Transactions on Microwave Theory and Techniques, IEEE, USA, vol. 52, No. 11, Nov. 1, 2004, pp. 2601-2610.

Office Action dated Oct. 14, 2022 issued in corresponding European Patent Application No. 19 908 360.1.

International Search Report (PCT/ISA/210) issued in PCT/JP2019/000202 dated Mar. 26, 2019.

European Summons to attend oral proceedings pursuant to Rule 115(1) EPC for European Application No. 19908360.1, dated Apr. 17, 2023.

* cited by examiner

TRANSMISSION PATH DESIGN ASSISTANCE SYSTEM, TRANSMISSION PATH DESIGN ASSISTANCE METHOD, AND COMPUTER READABLE MEDIUM STORING TRANSMISSION PATH DESIGN ASSISTANCE PROGRAM

CROSS REFERENCE TO RELATED APPLICATIONS

This application is a Continuation of PCT International Application No. PCT/JP2019/000202, filed on Jan. 8, 2019, which is hereby expressly incorporated by reference into the present application.

TECHNICAL FIELD

The present disclosure relates to a transmission path design assistance system and a transmission path design assistance method which assist in designing a transmission path of a signal.

BACKGROUND TECHNOLOGY

When a high-speed signal is transmitted via wires on a printed board, if the characteristic impedance of the transmission path including a connector in the middle does not match the output impedance of the input circuit or the input impedance of the output circuit, the signal is reflected, causing the transmission waveform to deteriorate.

The characteristic impedance of a signal line that constitutes the transmission path is an electrical parameter determined by factors such as the cross-sectional structure and the material of the signal line. Therefore, in general, by suitably designing the width of the signal line to thereby control the characteristic impedance, the waveform deterioration due to the signal reflections occurring at the mismatched parts is prevented.

In the case where the transmission circuit and the reception circuit are mounted on separate printed boards, the transmission circuit and the reception circuit are connected via the connectors mounted on the respective printed boards, and via signal lines which are provided on the respective printed boards to connect the respective circuits and connectors provided thereon.

In a case where the transmission circuit and the reception circuit are connected with a transmission path including the signal lines and the connectors as described above, it is necessary to design a transmission path having impedance that matches the impedance of the transmission circuit and the reception circuit. The characteristic impedance of the signal line can be adjusted by appropriately designing the signal line width. However, in a case where connectors to be used are already decided, the impedance of the connectors cannot be adjusted. Therefore, when a signal line is designed so as to have impedance that matches the transmission circuit and the reception circuit and then the circuits are connected simply through the connectors, it is not possible to obtain a transmission path with a good impedance matching as a whole.

For this problem, Patent Document 1 discloses a transmission path designing technique in which, at both ends of a mismatching part such as a connector, transformers having different lengths are connected in multiple stages to reduce reflection effects in a wide band.

PRIOR ART DOCUMENTS

Patent Documents

Patent Document 1: Japanese Patent No. 6385316

SUMMARY OF THE INVENTION

Problems to be Solved by the Invention

However, in the technique disclosed in Patent Document 1, the characteristic impedance for suppressing the influence of reflections is uniquely determined. Therefore, there is a problem that the technique cannot be used for designing a transmission path whose reflection values are specified for respective frequencies.

The present invention is made to solve the above problem, and the purpose is to obtain a transmission path design assistance system that can assist in designing a transmission path in which different reflection specification values are specified for respective frequencies.

Solution to Problems

The transmission path design assistance system according to the present disclosure includes: an acquisition unit to acquire reflection specification values of a reflection characteristic of a transmission path to be designed and a constraint of characteristic impedance distribution of the transmission path; and a computation processing unit including: a reflection characteristic calculation unit to calculate the reflection characteristic from inputted characteristic impedance distribution; a reflection characteristic modification unit to modify, on the basis of the reflection specification values acquired by the acquisition unit, the reflection characteristic calculated by the reflection characteristic calculation unit; a characteristic impedance distribution calculation unit to calculate characteristic impedance distribution from the reflection characteristic modified by the reflection characteristic modification unit; and a characteristic impedance distribution modification unit to modify, on the basis of the constraint acquired by the acquisition unit, the characteristic impedance distribution calculated by the characteristic impedance distribution calculation unit and output the modified characteristic impedance distribution to the reflection characteristic calculation unit.

The transmission path design assistance method according to the present disclosure includes: an acquisition step for acquiring reflection specification values of a reflection characteristic of a transmission path to be designed and a constraint of characteristic impedance distribution of the transmission path; a reflection characteristic calculation step for calculating the reflection characteristic from inputted characteristic impedance distribution; a reflection characteristic modification step for modifying, on the basis of the reflection specification values acquired by the acquisition step, the reflection characteristic calculated by the reflection characteristic calculation step; a characteristic impedance distribution calculation step for calculating characteristic impedance distribution from the reflection characteristic modified by the reflection characteristic modification step; and a characteristic impedance distribution modification step for modifying, on the basis of the constraint acquired by the acquisition step, the characteristic impedance distribu- tion calculated by the characteristic impedance distribution calculation step to use the modified characteristic impedance distribution to be inputted to the reflection characteristic calculation step.

Advantages of the Invention

The transmission path design assistance system according to the present disclosure is provided with a computation processing unit including: a reflection characteristic calculation unit to calculate reflection characteristics from an inputted characteristic impedance distribution; a reflection characteristic modification unit to correct, on the basis of reflection specification values, the reflection characteristics calculated by the reflection characteristic calculation unit; a characteristic impedance distribution calculation unit to calculate the characteristic impedance distribution from the reflection characteristics corrected by the reflection characteristic modification unit; and a characteristic impedance distribution modification unit to correct, on the basis of constraints, the characteristic impedance distribution calculated by the characteristic impedance distribution calculation unit and output the corrected characteristic impedance distribution to the reflection characteristic calculation unit. This configuration makes it possible to calculate the characteristic impedance distribution of the transmission path from the reflection characteristic corrected on the basis of the reflection specification values, thereby assisting in designing a transmission path for which different reflection specification values are specified for respective frequencies.

EMBODIMENTS

Embodiment 1

A transmission path design assistance system 1 according to the present embodiment repeats a series of processes of calculating a reflection characteristic from inputted characteristic impedance distribution, modifying the calculated reflection characteristic on the basis of reflection specification values, calculating characteristic impedance distribution from the modified reflection characteristic, and modifying the calculated characteristic impedance distribution on the basis of a constraint. This repetition of the processes makes it possible to effectively search for characteristic impedance distribution having a reflection characteristic satisfying the reflection specification values while meeting the constraint, whereby the transmission path design assistance system effectively assists in designing a transmission path in which different reflection specification values are specified for respective frequencies in a wide frequency range.

Figure 1:
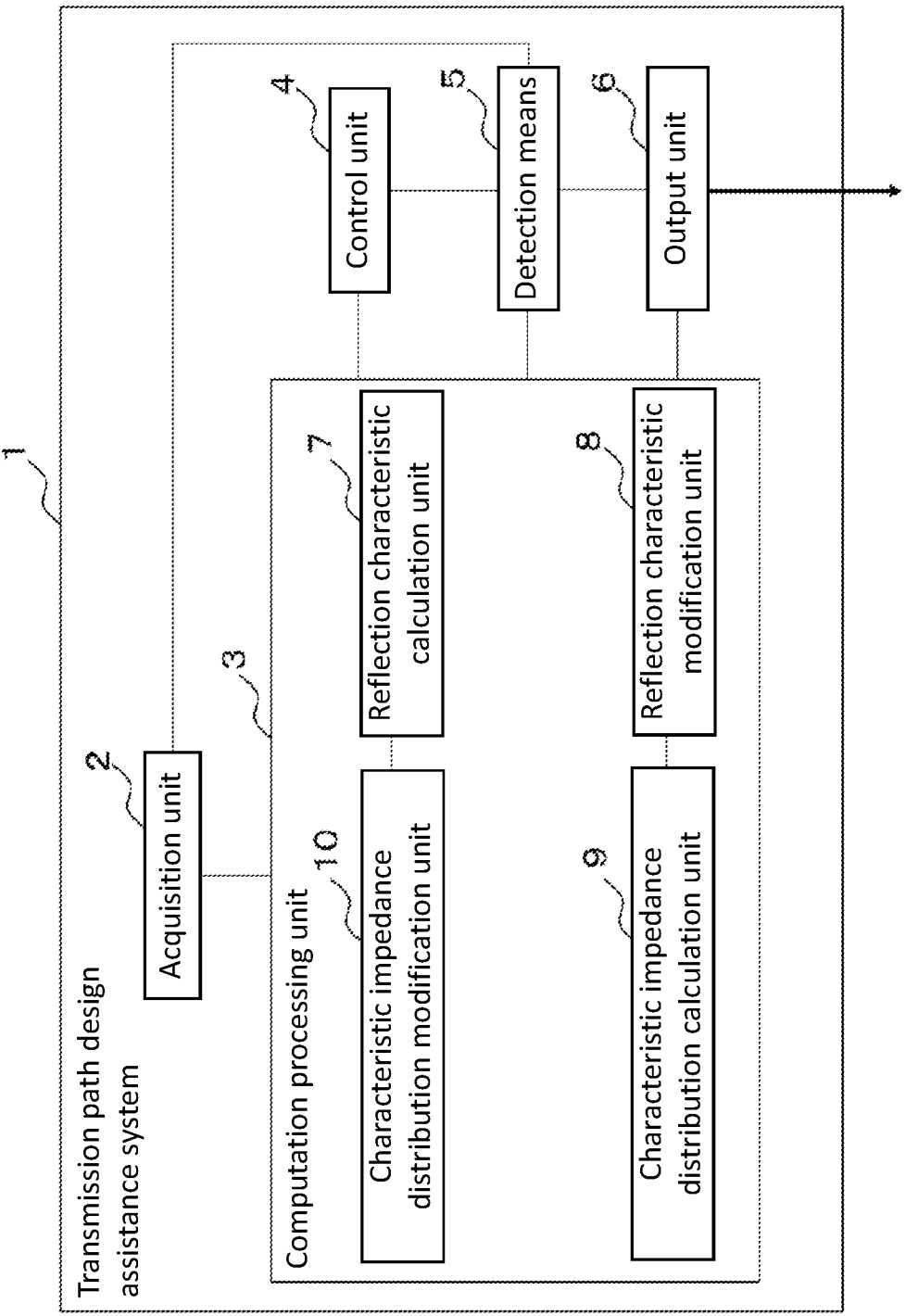
FIG. 1 is a diagram showing a configuration of a transmission path design assistance system of Embodiment 1.

FIG. 1 is a diagram showing a configuration of the transmission path design assistance system 1 of the present embodiment.

The transmission path design assistance system 1 shown in FIG. 1 includes: an acquisition unit 2 to acquire various information; a computation processing unit 3 to perform various calculations on the basis of the information acquired by the acquisition unit 2; a control unit 4 to control the operation of the computation processing unit 3; a detection means 5 to detect that a termination condition acquired by the acquisition unit 2 is satisfied; and an output unit 6 to output a calculation result of the computation processing unit 3. Each component of the transmission path design assistance system 1 configured as described above will be described in detail below.

The acquisition unit 2 acquires reflection specification values of a transmission path to be designed and constraints of the characteristic impedance of the transmission path. Note that the reflection specification values specify the absolute values of the reflection characteristic allowed for respective frequencies. The constraints of the characteristic impedance distribution are conditions for realizable characteristic impedance in the transmission path to be designed; for example, the conditions include prohibiting negative characteristic impedance values, fixing a characteristic impedance value at a specific point, prohibiting a steep characteristic impedance change, and the like.

The acquisition unit 2 of the present embodiment also acquires initial distribution of the characteristic impedance distribution of the transmission path and the termination condition of an iterative process described later.

The acquisition unit 2 may be configured as an input device through which the user of this transmission path design assistance system 1 inputs the reflection specification values, the constraint, and the termination condition described above, or may be configured as a communication device which obtains the reflection specification values, the constraint, and the termination condition from the outside by its communication function. How to acquire initial distribution of the characteristic impedance distribution is not limited to the way of using the input device or the communication device to acquire the initial distribution from the outside, but the acquisition unit 2 may generate initial distribution from random numbers or the like.

The computation processing unit 3 includes: a reflection characteristic calculation unit 7 to calculate the reflection characteristic from inputted characteristic impedance distribution; a reflection characteristic modification unit 8 to modify, on the basis of the reflection specification values acquired by the acquisition unit 2, the reflection characteristic calculated by the reflection characteristic calculation unit 7; a characteristic impedance distribution calculation unit 9 to calculate characteristic impedance distribution from the reflection characteristic modified by the reflection characteristic modification unit 8; and a characteristic impedance distribution modification unit 10 to modify, on the basis of the constraint acquired by the acquisition unit 2, the characteristic impedance distribution calculated by the characteristic impedance distribution calculation unit 9 and output the modified characteristic impedance distribution to the reflection characteristic calculation unit 7.

The reflection characteristic calculation unit 7 calculates a reflection characteristic from the inputted characteristic impedance distribution. As a specific calculation method, for example, a method based on a Fourier transform described in the following Reference 1 can be used.

Reference 1

Robert E. Collin, "FOUNDATIONS FOR MICROWAVE ENGINEERING", Second Edition, 1992, p. 370-375

On the basis of the reflection specification values acquired by the acquisition unit 2, the reflection characteristic modification unit 8 modifies the reflection characteristic calculated by the reflection characteristic calculation unit 7. The reflection coefficient on the input side is used as the reflection characteristic. Assuming that the input side terminal is terminal 1 in a two-terminal pair network and the output side terminal is terminal 2 therein, the reflection coefficient is the (1, 1) component of the S matrix, i.e. S11. As an index of the influence of reflections on the waveform, a transmission coefficient may be used instead of the reflection coefficient, or an expression method other than the S-matrix may be used.

To be specific, the method of modifying the reflection characteristic is, for example, to replace a reflection characteristic value exceeding the reflection specification value in the frequency domain with an appropriate value less than or equal to the reflection specification value, or to reduce, by a predetermined percentage, a reflection characteristic value exceeding the reflection specification value in the frequency domain.

The characteristic impedance distribution calculation unit 9 calculates characteristic impedance distribution from the reflection characteristic modified by the reflection characteristic modification unit 8. As a specific calculation method, a method based on an inverse Fourier transform described in Reference 1 can be used similarly to the reflection characteristic calculation unit 7.

On the basis of the constraint of the characteristic impedance distribution acquired by the acquisition unit 2, the characteristic impedance distribution modification unit 10 modifies the characteristic impedance distribution calculated by the characteristic impedance distribution calculation unit 9. Specific methods for modifying the characteristic impedance distribution include, for example, replacing characteristic impedance having a negative value with that having an appropriate positive value, replacing the characteristic impedance value at a part where a connector etc. is mounted with a predetermined value, and modifying a steep change in characteristic impedance value to a gradual change.

The control unit 4 controls to iterate a series of processes consisting of calculation of reflection characteristic by the reflection characteristic calculation unit 7, modification of the reflection characteristic by the reflection characteristic modification unit 8, calculation of characteristic impedance distribution by the characteristic impedance distribution calculation unit 9, and modification of the characteristic impedance distribution by the characteristic impedance distribution modification unit 10.

In a case where the constraints of the characteristic impedance distribution acquired by the acquisition unit 2 are so strict that the characteristic impedance distribution modification unit 10 makes an extremely large modification to the value of the characteristic impedance distribution calculated by the characteristic impedance calculation unit, the reflection characteristic calculated from the modified characteristic impedance distribution may not satisfy the reflection specification value acquired by the acquisition unit 2. In a case where a desired calculation result is not obtained after performing a single series of the processes, iteration of the series is performed to converge the characteristic impedance distribution and the reflection characteristic to obtain calculation solutions, giving more effective calculation results for design assist.

The detection means 5 detects that the termination condition acquired by the acquisition unit 2 is satisfied, and ends the iterative series of processes performed by the control unit 4. The termination condition is defined, for example, with the number of iterations, the calculation results' differences from the target reflection characteristic and the target characteristic impedance distribution, or the convergence degree of the calculation results obtained by the iteration.

In a case where the detection means 5 detects that the termination condition is satisfied, the output unit 6 outputs the characteristic impedance distribution calculated by the iterative processes as a design assistance result.

The transmission path design assistance system 1 of the present embodiment is configured as described above.

Figure 2:
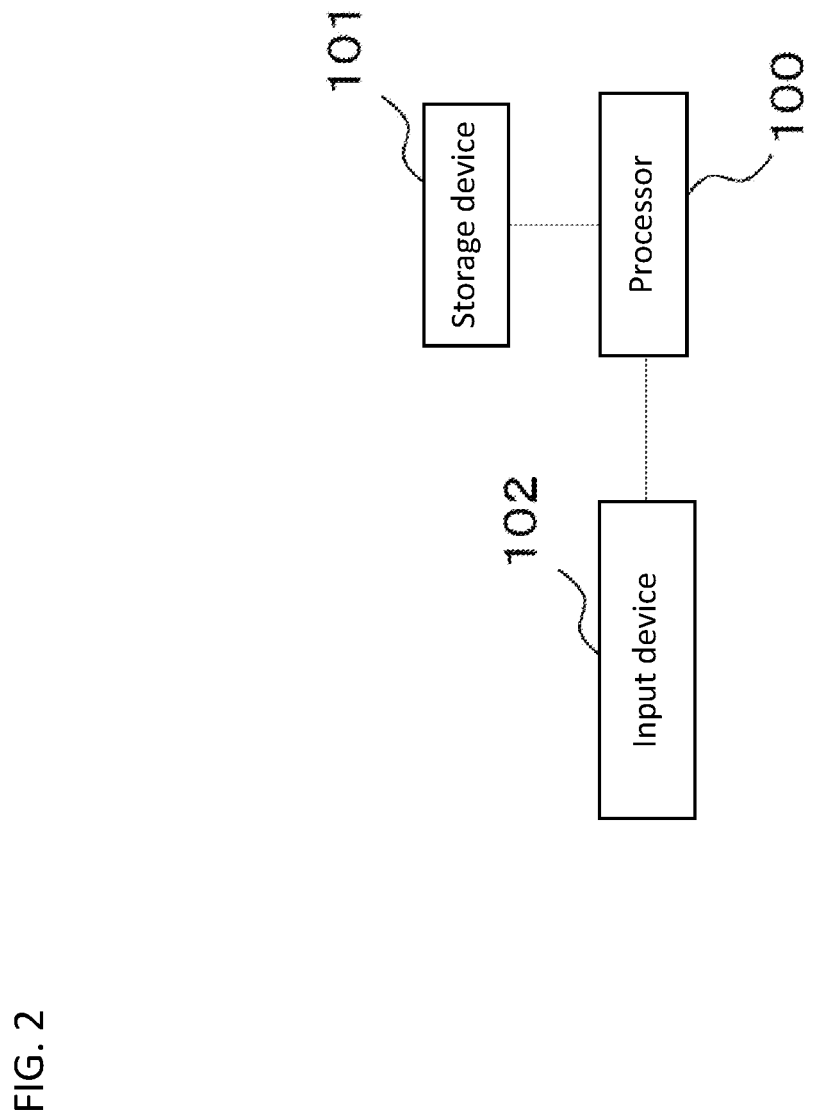
FIG. 2 is a diagram showing a hardware configuration of the transmission path design assistance system of Embodiment 1.

Each function of the transmission path design assistance system 1 is realized by a computer. FIG. 2 is a diagram showing an example of the hardware configuration of a computer that realizes the transmission path design assistance system 1. The hardware shown in FIG. 2 includes a processor 100 such as a central processing unit (CPU), a storage device 101 such as a read only memory (ROM) or a hard disk, and an input device 102.

The acquisition unit 2 shown in FIG. 1 is realized by the input device 102; and the processor 100 executes a program stored in the storage device 101 to realize the computation processing unit 3, the control unit 4, the detection means 5, and the output unit 6.

As previously described, the acquisition unit 2 may not be realized by the input device 102; the acquisition unit may be realized by a communication device not shown in the figure or the processor 100 may executes a program stored in the storage device 101 to realize the acquisition unit.

The method for realizing individual functions of the transmission path design assistance system 1 is not limited to the above-described realization method of combining hardware and a program. The individual functions may be realized only with hardware such as a large-scale integrated circuit (LSI) that is a processor implemented with the program; or some of the individual functions may be realized with dedicated hardware, and the rest of them may be realized by combining a processor and a program.

Next, the operation of the transmission path design assistance system 1 of the present embodiment will be described.

Figure 3:
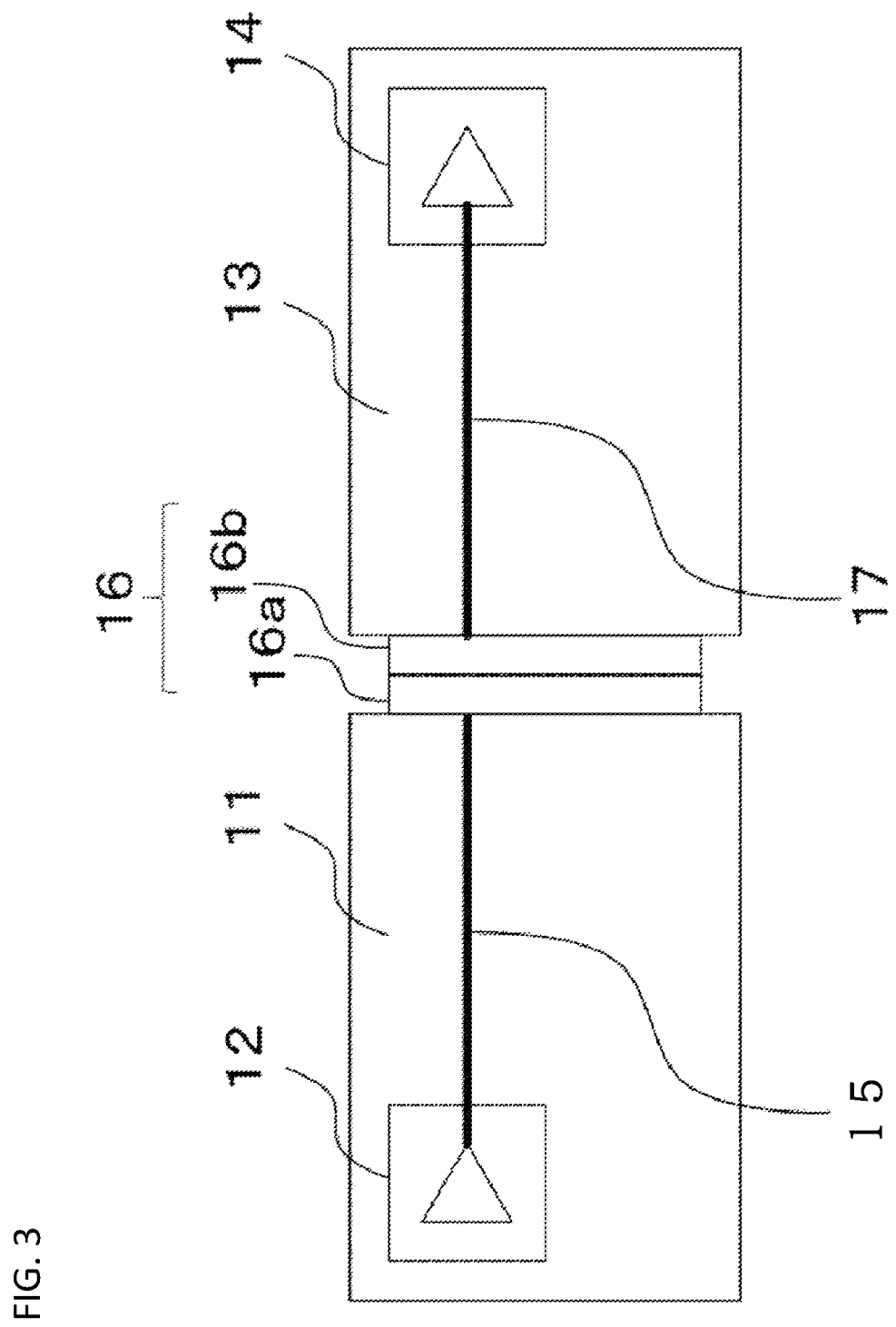
FIG. 3 is a diagram showing a wiring configuration of printed boards including a transmission path to be designed using the transmission path design assistance system of Embodiment 1.

FIG. 3 is a diagram showing a wiring configuration of printed boards including a transmission path to be designed.

A transmission circuit 12 is mounted on a printed board 11 and a reception circuit 14 is mounted in on a printed board 13. The transmission circuit 12 and the reception circuit 14 are connected via a signal line 15, a connector 16a, a connector 16b, and a signal line 17. When the connector 16a and the connector 16b are connected, they are hereinafter collectively referred to as a connector 16. The present embodiment performs a design assistance of the transmission path consisting of the signal line 15, the connector 16, and the signal line 17.

Figure 4:
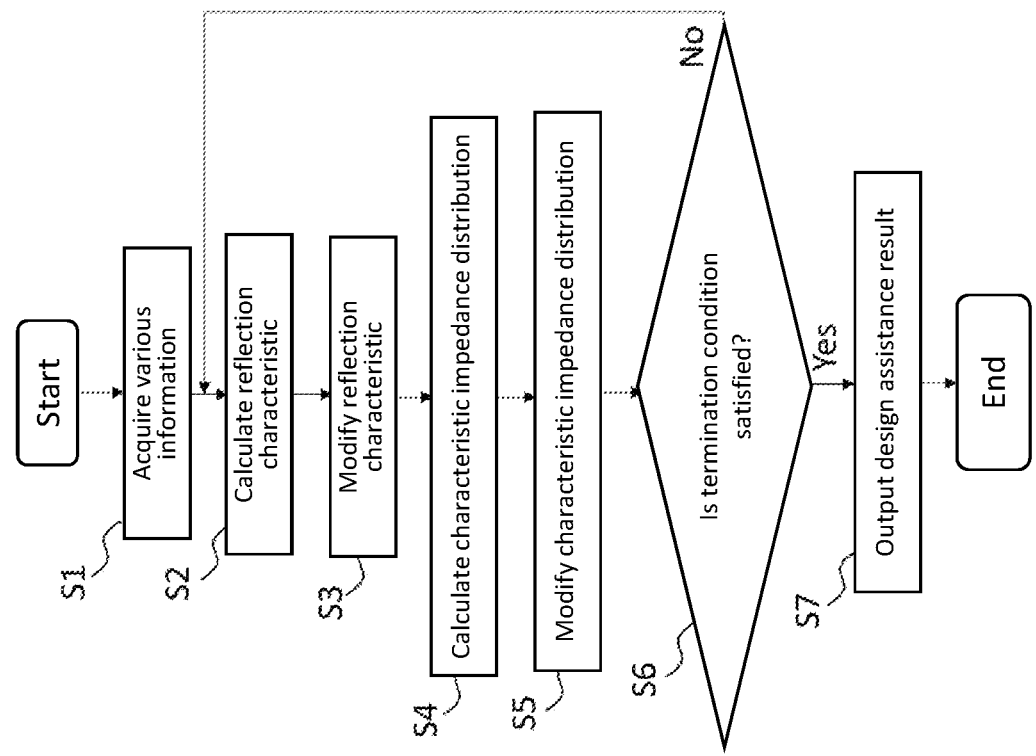
FIG. 4 is a flowchart showing how the transmission path design assistance system 1 of Embodiment 1 operates to obtain a design assistance result for the transmission path.

FIG. 4 is a flowchart showing how the transmission path design assistance system 1 of the present embodiment operates to obtain a design assistance result for the transmission path.

When the transmission path design assistance system 1 starts for obtaining a design assistance result of the transmission path, the acquisition unit 2 first acquires various information in step S1. More specifically, the acquisition unit 2 acquires reflection specification values of the transmission path to be designed, constraints of characteristic impedance distribution of the transmission path, initial distribution of the characteristic impedance distribution, and a termination condition of the iterative process.

Figure 5:
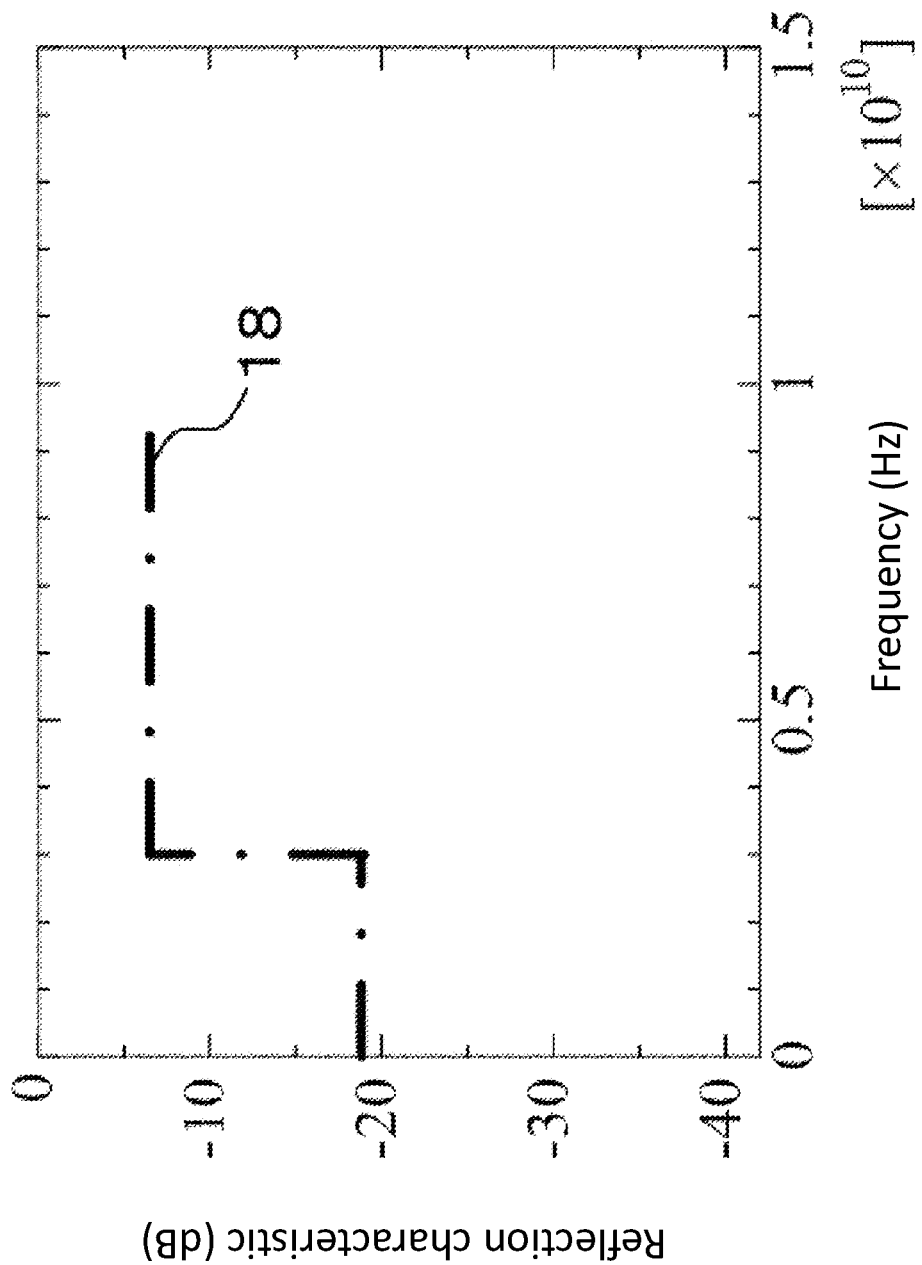
FIG. 5 is an illustrative graph showing a specific example of reflection specification values of a transmission path in Embodiment 1.

Reflection specification values 18 of the transmission path in this working example are the upper limit of the reflection characteristic of the transmission path; for example, the reflection specification values are defined as a step function shown in FIG. 5.

For the characteristic impedance distribution in this working example, there are three constraints: "prohibiting characteristic impedance from becoming a negative value"; "fixing the characteristic impedance value of the connector 16 to a predetermined value"; and "prohibiting characteristic impedance from steeply changing". The predetermined value to which the characteristic impedance of the connector 16 is fixed is set appropriately according to a specific connector used in the transmission path to be designed. Also, changes in the characteristic impedance are set by defining the upper limit of, for example, the slope of its changes.

In the initial distribution in this working example, the characteristic impedance values of the signal line 15 and the signal line 17 are set to 50Ω, and the characteristic impedance values of the connectors are set to 40Ω.

The termination condition of the iterative process is that the reflection characteristics calculated by the reflection characteristic calculation unit 7 and the characteristic impedance distribution calculated by the characteristic impedance distribution calculation unit 9 satisfy, within a loop, the reflection specification values obtained by the acquisition unit 2 and the constraints obtained thereby, respectively. Note here that the loop means a series of processes consisting of calculation of a reflection characteristic by the reflection characteristic calculation unit 7; modification of the reflection characteristic the reflection characteristic modification unit 8; calculation of characteristic impedance distribution by the characteristic impedance distribution calculation unit 9; and modification of the characteristic impedance distribution by the characteristic impedance distribution modification unit 10. In a case where the series of processes starts from the process of the reflection characteristic calculation unit 7, a single loop is defined as processes in which the loop starts when the reflection characteristic calculation unit 7 calculates the reflection characteristics and ends when the characteristic impedance distribution modification unit 10 modifies the characteristic impedance distribution and outputs the modified characteristic impedance distribution to the reflection characteristic calculation unit 7. Therefore, the above loop is repeated in the transmission path design assistance system 1; and the loop processing ends when the reflection characteristics satisfy the reflection specification values in a certain loop and the characteristic impedance distribution satisfies the constraints in the same loop.

Next, in step S2, the reflection characteristic calculation unit 7 calculates a reflection characteristic from the inputted characteristic impedance distribution using the Fourier transform. The initial distribution acquired by the acquisition unit 2 is used only for the first loop as characteristic impedance distribution inputted to the reflection characteristic calculation unit 7; for the subsequent loops, the characteristic impedance distribution modified by the characteristic impedance distribution modification unit 10 is used.

Next, in step S3, the reflection characteristic modification unit 8 modifies, on the basis of the reflection specification values acquired by the acquisition unit 2, the reflection characteristic calculated by the reflection characteristic calculation unit 7. To be specific, a reflection characteristic value of the frequency domain that exceeds a reflection specification value is replaced with the reflection specification value.

Next, in step S4, the characteristic impedance distribution calculation unit 9 calculates characteristic impedance distribution from the reflection characteristic modified by the reflection characteristic modification unit 8 using the inverse Fourier transform.

Next, in step S5, the characteristic impedance distribution modification unit 10 modifies, on the basis of the constraints acquired by the acquisition unit 2, the characteristic impedance distribution calculated by the characteristic impedance distribution calculation unit 9. To be specific, the value of the characteristic impedance at a part where the characteristic impedance is calculated as a negative value is replaced with 1Ω; the value of the characteristic impedance at a part where the connector is mounted is replaced with 40Ω. Also, the characteristic impedance at a part where the characteristic impedance changes steeply is modified to characteristic impedance that changes gradually.

Next, in step S6, the detection means 5 detects whether or not the termination condition is satisfied. If the termination condition is not satisfied, the detection means 5 notifies the control unit 4 that the termination condition is not satisfied. When the control unit 4 receives the above notification, it controls the process to return to step S2, whereby the reflection characteristic calculation unit 7 calculates the reflection characteristic. Then, the processes from step S2 to step S5 are performed again.

Until the detection means 5 detects that the termination condition is satisfied, the processes from step S2 to step S5 are repeated. When the detection means 5 detects that the termination condition is satisfied, the detection means 5 notifies the control unit 4 that the termination condition is satisfied. When the control unit 4 receives the above notification, the control unit 4 ends the iterative process and proceeds to step S7.

In step S7, the output unit 6 outputs the characteristic impedance distribution calculated by the characteristic impedance distribution calculation unit 9 as a design assistance result.

Because the transmission path design assistance system 1 operates as described above, it is possible to effectively search for characteristic impedance distribution that has a reflection characteristic satisfying the reflection specification values and which also satisfies the constraints. Therefore, the transmission path design assistance system 1 can effectively assist in designing a transmission path for which different reflection specification values are specified at respective frequencies in a wide frequency range.

Figure 6:
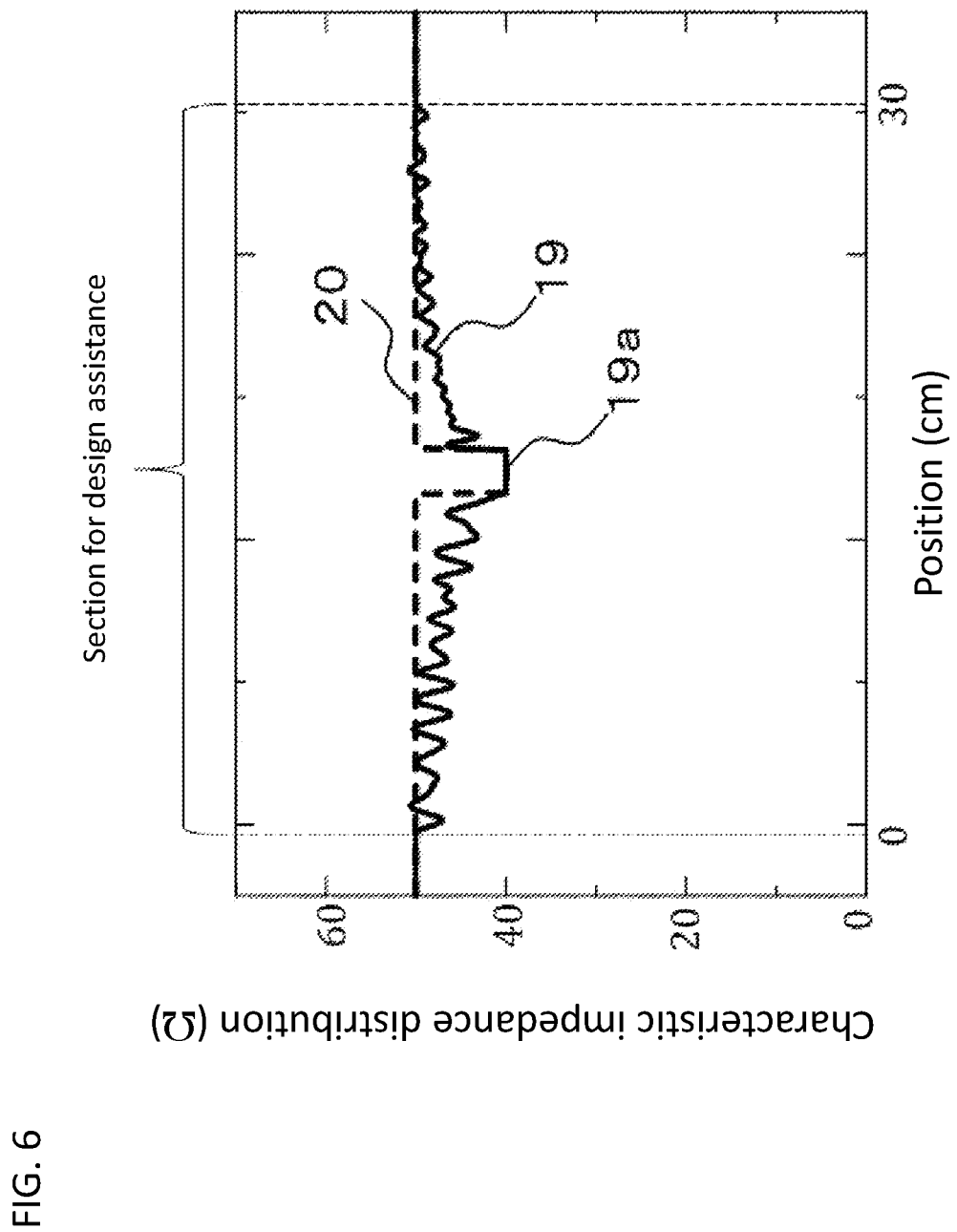
FIG. 6 is a graph showing a specific example of characteristic impedance distribution obtained as the design assistance result of Embodiment 1.
Figure 7:
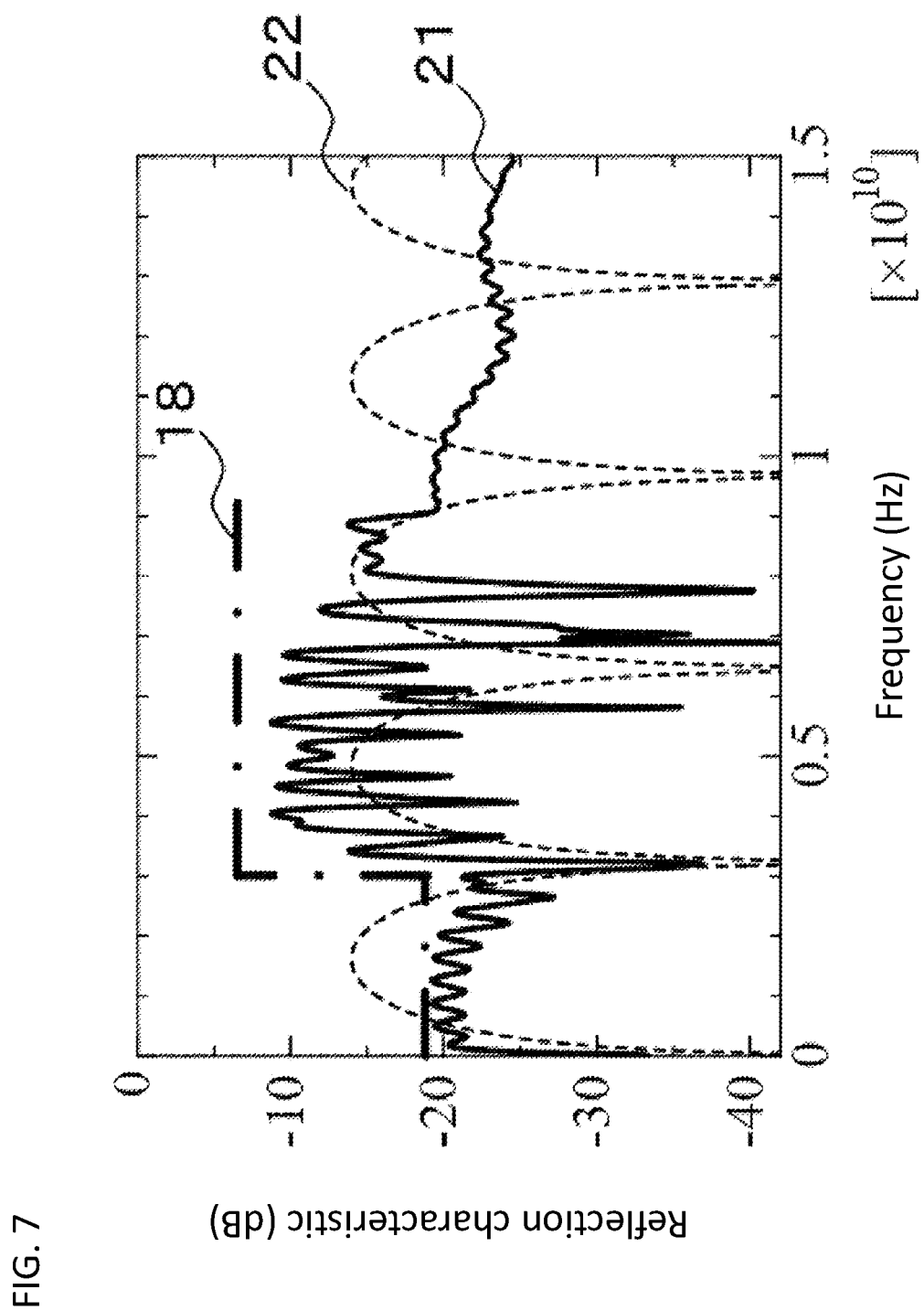
FIG. 7 is a characteristic graph showing a reflection characteristic corresponding to the characteristic impedance distribution of FIG. 6.

Examples of the design assistance result obtained by the operation of the transmission path design assistance system 1 of the present embodiment are shown in FIG. 6 and FIG. 7.

FIG. 6 is a graph showing the characteristic impedance distribution obtained as a design assistance result.

In FIG. 6, a solid line indicates characteristic impedance distribution 19 obtained as the design assistance result; a dotted line indicates initial distribution 20; and characteristic impedance distribution 19a shown by a straight line indicates characteristic impedance where the values are fixed due to the connectors mounted.

Strictly speaking, characteristic impedance is expressed as a complex number, but it is generally expressed as a real number in a high frequency band. Therefore, the characteristic impedance is expressed as a real number also in the present embodiment. In this regard, when the characteristic impedance distribution calculation unit 9 calculates characteristic impedance distribution using the inverse Fourier transform, a condition that the characteristic impedance distribution are real numbers may be given.

FIG. 7 is a characteristic graph showing a reflection characteristic 21 corresponding to the characteristic impedance distribution 19 of FIG. 6. The vertical axis shows the absolute values of the reflection characteristic expressed in decibels, each of which is expressed as in Equation (1). In Equation (1), S11 is the reflection coefficient at the position of zero centimeters in FIG. 6.

Equation 1

$$20\log_{10}(|S_{11}|) \text{ [dB]} \qquad (1)$$

In FIG. 7, the dotted line shows the reflection characteristic 22 corresponding to the initial distribution; the solid line shows the reflection characteristic 21 obtained as the design assistance result; and the alternate long and short dash line shows the reflection specification values 18. From the figures, it can be seen that the reflection characteristic 21 obtained as the design assistance result are lower than the reflection specification values 18 in all frequency domains.

In the present embodiment, the acquisition unit 2 acquires initial distribution of the characteristic impedance distribution; the reflection characteristic calculation unit 7 calculates a reflection characteristic from the initial distribution; and after that, the reflection characteristic modification unit 8, the characteristic impedance distribution calculation unit 9, and the characteristic impedance distribution modification unit 10 perform their respective operations successively in the order named. However, alternative operations are also possible in which the acquisition unit 2 acquires initial values of the reflection characteristic, and the characteristic impedance distribution calculation unit 9 calculates characteristic impedance distribution from the initial values, and after that, the characteristic impedance distribution modification unit 10, the reflection characteristic calculation unit 7, and the reflection characteristic modification unit 8 perform their respective operations successively in the order named.

In the present embodiment, the operations are performed for obtaining assistance in designing a transmission path consisting of a single line. However, the present embodiment can also be applied to a transmission path consisting of two lines. In other words, the characteristic impedance here naturally includes the differential impedance.

The output unit 6 of the present embodiment outputs, as its design assistance result, characteristic impedance distribution calculated by the characteristic impedance distribution calculation unit 9, but the design assistance result to be outputted by the output unit 6 is not limited to this. For example, the output unit 6 may output line widths for realizing the characteristic impedance distribution modified by the characteristic impedance distribution modification unit 10 or line widths for realizing the characteristic impedance distribution calculated by the characteristic impedance distribution calculation unit 9. That is to say, the transmission path design assistance system may have a configuration in which the acquisition unit 2 acquires electromagnetic parameters such as the permittivity and the permeability of a transmission path to be designed, and the output unit 6 calculates line widths on the basis of the parameters to output the calculation results.

The present disclosure focuses on the fact that, in the case of assisting in designing a transmission path for which only the absolute values of the reflection characteristic are specified with no specifications about the phases thereof, a Fourier iterative method can give realizable design values for the transmission path in each of the physical domain and the frequency domain, the Fourier iterative method being performed by repeating, while complementing known information in the domains, the Fourier transform and the inverse Fourier transform to acquire suitable values in the respective domains.

INDUSTRIAL APPLICABILITY

The transmission path design assistance system according to the present disclosure is applicable to assisting in designing a transmission path.

SYMBOLS

1: transmission path design assistance system, 2: acquisition unit, 3: computation processing unit, 4: control unit, 5: detection means, 6: output unit, 7: reflection characteristic calculation unit, 8: reflection characteristic modification unit, 9: characteristic impedance distribution calculation unit, 10: characteristic impedance distribution modification unit, 11: printed board, 12: transmission circuit, 13: printed board, 14: reception circuit, 15: signal line, 16: connector, 17: signal line, 18: reflection specification value, 19: characteristic impedance distribution, 20: initial distribution, 21: reflection characteristic, 22: reflection characteristic, 100: processor, 101: storage device, 102: input device

The invention claimed is:

1. A transmission path design assistance system comprising:
    acquiring circuitry to acquire reflection specification values of a reflection characteristic of a transmission path to be designed and a constraint of characteristic impedance distribution of the transmission path; and
    computation processing circuitry including:
        reflection characteristic calculating circuitry to calculate the reflection characteristic from inputted characteristic impedance distribution;
        reflection characteristic modifying circuitry to modify, on the basis of the reflection specification values acquired by the acquiring circuitry, the reflection characteristic calculated by the reflection characteristic calculating circuitry;
        characteristic impedance distribution calculating circuitry to calculate characteristic impedance distribution from the reflection characteristic modified by the reflection characteristic modifying circuitry; and
        characteristic impedance distribution modifying circuitry to modify, on the basis of the constraint acquired by the acquiring circuitry, the characteristic impedance distribution calculated by the characteristic impedance distribution calculating circuitry and output the modified characteristic impedance distribution to the reflection characteristic calculating circuitry.

2. The transmission path design assistance system according to claim 1, further comprising controlling circuitry to make the computation processing circuitry iterate a series of processes consisting of the calculation of the reflection characteristic by the reflection characteristic calculating circuitry, the modification of the reflection characteristic by the reflection characteristic modifying circuitry, the calculation of the characteristic impedance distribution by the characteristic impedance distribution calculating circuitry, and the modification of the characteristic impedance distribution by the characteristic impedance distribution modifying circuitry.

3. The transmission path design assistance system according to claim 2,
wherein the acquiring circuitry further acquires a termination condition for ending the iterative series of processes performed by the controlling circuitry, and
wherein the transmission path design assistance system further comprises:
detecting circuitry to detect that the termination condition acquired by the acquiring circuitry is satisfied and to end the iterative series of processes performed by the controlling circuitry; and
outputting circuitry to output the characteristic impedance distribution calculated by the iterative series of processes as a design assistance result when the detecting circuitry detects that the termination condition is satisfied.

4. The transmission path design assistance system according to claim 1, wherein the reflection characteristic calculating circuitry calculates the reflection characteristic from the characteristic impedance distribution using a Fourier transform.

5. The transmission path design assistance system according to claim 1, wherein the characteristic impedance distribution calculating circuitry calculates the characteristic impedance distribution using an inverse Fourier transform.

6. The transmission path design assistance system according to claim 1, wherein the constraint acquired by the acquiring circuitry prohibits a characteristic impedance from becoming a negative value.

7. The transmission path design assistance system according to claim 1, wherein the constraint acquired by the acquiring circuitry fixes a characteristic impedance of a mismatched part to have a predetermined value.

8. The transmission path design assistance system according to claim 1, wherein the constraint acquired by the acquiring circuitry prohibits a steep characteristic impedance change.

9. The transmission path design assistance system according to claim 3, wherein the outputting circuitry further outputs a line width of the transmission path as a design assistance result.

10. A transmission path design assistance method comprising:
acquiring reflection specification values of a reflection characteristic of a transmission path to be designed and a constraint of characteristic impedance distribution of the transmission path;
calculating the reflection characteristic from inputted characteristic impedance distribution;
modifying, on the basis of the acquired reflection specification values, the calculated reflection characteristic;
calculating characteristic impedance distribution from the modified reflection characteristic; and
modifying, on the basis of the acquired constraint, the calculated characteristic impedance distribution to use the modified characteristic impedance distribution to be inputted to the reflection characteristic calculation.

11. A non-transitory computer readable medium storing a program for making a computer perform:
acquiring reflection specification values of a reflection characteristic of a transmission path to be designed and a constraint of characteristic impedance distribution of the transmission path;
calculating the reflection characteristic from inputted characteristic impedance distribution;
modifying, on the basis of the acquired reflection specification values, the calculated reflection characteristic;
calculating characteristic impedance distribution from the modified reflection characteristic; and
modifying, on the basis of the acquired constraint, the calculated characteristic impedance distribution to use the modified characteristic impedance distribution to be inputted to the reflection characteristic calculation.

* * * * *